United States Patent [19]

Hanebuth

[11] Patent Number: 4,788,658

[45] Date of Patent: Nov. 29, 1988

[54] APPARATUS FOR CONNECTING COMPUTER COMPONENTS

[76] Inventor: Charles E. Hanebuth, 11177 Vessey Ct., Bloomington, Minn. 55437-3141

[21] Appl. No.: 881,974

[22] Filed: Jul. 3, 1986

[51] Int. Cl.$^4$ .................. G06F 15/02; G06F 15/16
[52] U.S. Cl. ........................ 364/900; 364/708
[58] Field of Search .............. D14/111, 100, 106; 364/200 MS File, 900 MS File, 708, 709

[56] References Cited

U.S. PATENT DOCUMENTS

| | | | |
|---|---|---|---|
| D. 245,200 | 7/1977 | Packard | D14/111 |
| D. 252,273 | 7/1979 | Arjani et al. | D14/109 |
| D. 266,514 | 10/1982 | Fernalld, Jr. et al. | D14/114 |
| D. 270,453 | 9/1983 | Takahashi | D14/100 |
| D. 271,102 | 10/1983 | Manock et al. | D14/109 |
| D. 276,342 | 11/1984 | Kitai | D14/111 |
| D. 278,390 | 4/1985 | Enomoto | D14/100 |
| D. 279,564 | 7/1985 | Anderson et al. | D14/100 |
| D. 280,511 | 9/1985 | Moggridge et al. | D14/106 |
| D. 283,711 | 5/1986 | Deura et al. | D14/100 |
| D. 284,195 | 6/1986 | Davis et al. | D14/114 |
| D. 284,671 | 7/1986 | Mendel | D14/100 |
| D. 285,562 | 9/1986 | Graham et al. | D14/100 |
| D. 285,923 | 9/1986 | Takahashi et al. | D14/100 |
| D. 286,534 | 11/1986 | Holloman et al. | D14/111 |
| D. 287,724 | 1/1987 | Keely et al. | D14/100 |
| D. 287,967 | 1/1987 | Gemmell et al. | D14/100 |
| D. 288,446 | 2/1987 | Moggride | D14/106 |
| 4,002,892 | 1/1977 | Zielinski | 364/708 |
| 4,220,992 | 9/1980 | Blood et al. | 364/709 |
| 4,379,336 | 4/1983 | Yamamoto et al. | 364/708 |
| 4,530,066 | 7/1985 | Ohwaki et al. | 364/708 |
| 4,654,818 | 3/1987 | Wetterau, Jr. | 364/709 |

FOREIGN PATENT DOCUMENTS

| | | | |
|---|---|---|---|
| 2607868 | 9/1976 | Fed. Rep. of Germany | 364/708 |
| 0039339 | 3/1977 | Japan | 364/708 |
| 0160418 | 8/1985 | Japan | 364/708 |

OTHER PUBLICATIONS

"Extension Device for a Personal Computer", IBM Technical Disclosure Bulletin, vol. 27, No. 12, May 1985, pp. 6887–6890.

*Primary Examiner*—Gareth D. Shaw
*Assistant Examiner*—Viet Q. Nguyen
*Attorney, Agent, or Firm*—Orrin M. Haugen; Thomas J. Nikolai; Frederick W. Niebuhr

[57] ABSTRACT

This invention relates primarily to a new apparatus that can be used to electrically and/or physically connect computer components. More particularly, the present invention is directed to apparatus which can be used to quickly and easily connect a small portable computer to peripheral equipment such as a modem, mass storage device, printer, display or the like.

8 Claims, 2 Drawing Sheets

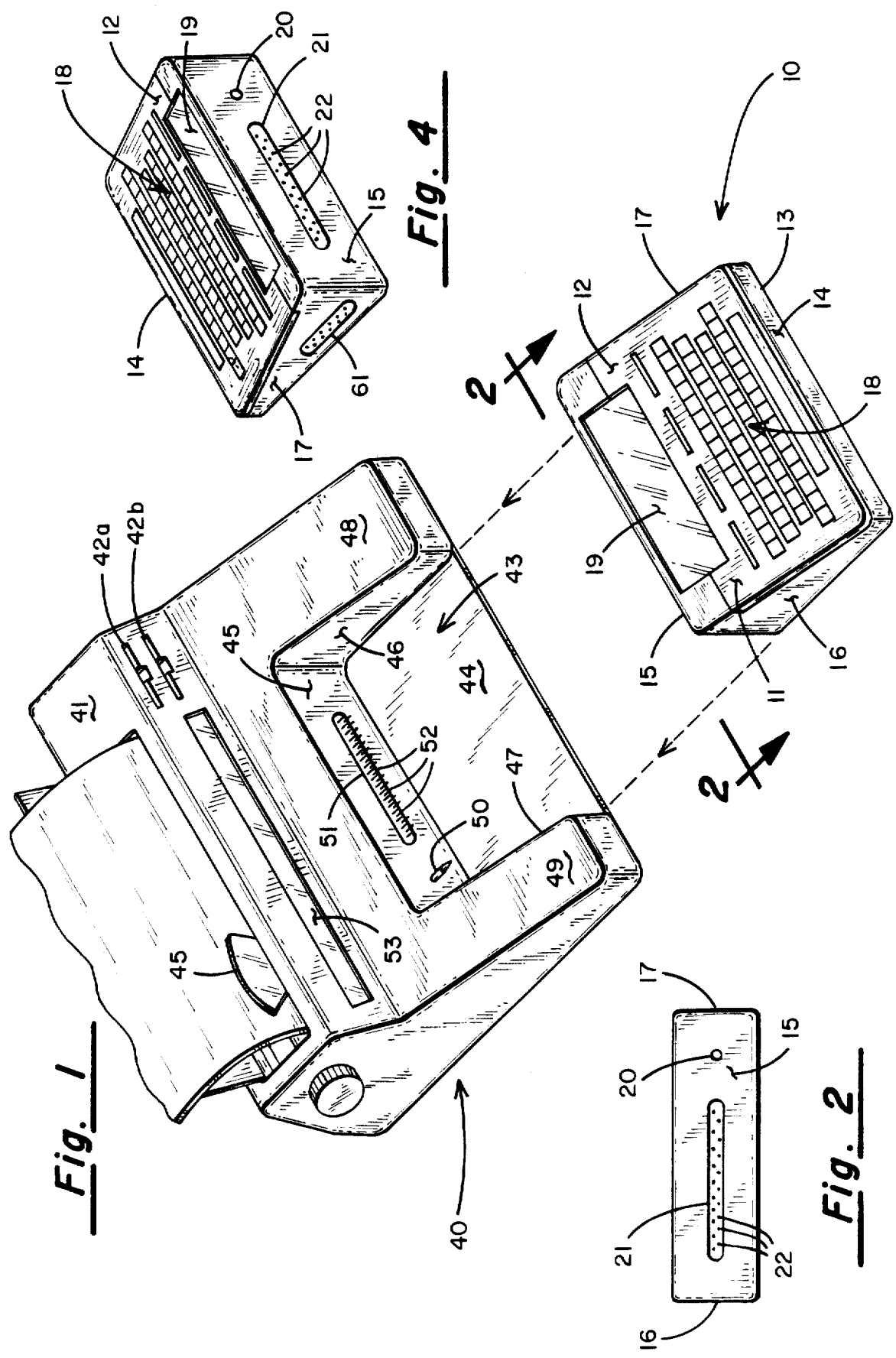

APPARATUS FOR CONNECTING COMPUTER COMPONENTS

BACKGROUND OF THE INVENTION

During the past three decades, great advances have been made in the computer and data processing fields. The advent and development of electronic microchips has brought computers into the home. In fact, home computers that today can fit on desk top are more powerful and are capable of storing more data than the computers built twenty to thirty year ago that would fill entire rooms.

Today, easily transportable lap-top computers such as the Tandy Model 100 and the Tandy Model 200 are readily available and widely sold. The primary advantage of such lap-top computers is that they can be easily moved and used in various locations at various times. Manufacturers of such lap-top computers, to keep them lightweight and easily portable, have generally combined one or more components into a single housing. One such computer that has enjoyed commercial success weighs only about four pounds and combines the computer, a keyboard, a liquid crystal display and a modem within a single housing. The computers are built so that they can be operated anywhere on battery power. They are small enough and lightweight enough to easily fit into a briefcase or book bag.

Such lap-top computers, however, must generally be connected to other peripheral equipment for them to become a truly effective tool for most applications. It is often necessary for them to be connected to a disc drive for archiving data, and to a printer for making paper copies of work generated at a remote location. There may also be the need to connect the computer to a modem to transmit data to a computer at another location. Further, it may be desirable to connect the lap-top computer to a more sophisticated display, memory and input devices.

Many users find it is necessary to make as many as a dozen separate electrical connections to connect the necessary peripheral equipment to their lap-top computer. The cable connectors traditionally used to interconnect the components were not designed for frequent connection and disconnection and tend to wear out quickly. Also, the process is somewhat time consuming.

Other disadvantages arise from the need to make numerous electrical connections on a relatively frequent basis. Cable connections, for example, unnecessarily reduce system reliability. The need for numerous cables and several separate power supplies causes the cost of the system to be unnecessarily high. Such systems also require more physical space to set up and operate than is desirable. More electrical energy is unnecessarily consumed because each of the components has its own power supply. Further, if the connections are made improperly, damage can be done to the hardware and software. Data stored in the memory could also be lost.

Most users, therefore, would find it desirable to have either a portable computer with greater capacities so that the peripheral equipment would not be necessary. Alternatively, such users would find it desirable to have an apparatus such as that of the present invention which would expand the capabilities of lap-top computers, greatly speed up the process of connecting computer components, eliminate the possibility of improper cable connection, require no special skill to operate, reduce maintenance costs, improve service life and reliability, reduce electrical energy consumption, reduce the physical space requirements, and reduce the connection time from a considerable number of minutes to just a few seconds.

In the prior art there have been several approaches to expanding the capability of data processing equipment. However, none of these efforts have achieved all of the advantages of the present invention. For example, U. S. Pat. No. 3,940,758 to Margolin dated Feb. 24, 1976 is directed to an expandable keyboard for a pocket-type calculator which is made in modular form with the various modules hinged together. Normally the modules form a stack. The modules, because they are hinged, can be folded out to form a much larger keyboard with more keys than the keyboards found on conventional pocket calculators. While somewhat pertinent because it generally relates to problems similar to those solved by the present invention, the approach is clearly different. It is not directed to a means for attaching peripheral components. Instead it is directed to a manner in which a set of components can be configured to reduce their overall size.

Also of interest is U.S. Pat. No. 4,564,751 to Alley et al dated Jan. 14, 1986. This patent is not directed toward an apparatus which permits multiple peripheral components to be attached to a lap-top computer. Instead, it is directed to a wrap-around auxiliary keyboard which is used to input data. The basic purpose of this design is to prevent keyboard incompatibility so that software compatible with a first hardware computer system such as an IBM PC may be run on a second otherwise incompatible computer hardware system such as an Apple MacIntosh. This is an entirely different problem than that solved by the present invention.

SUMMARY OF THE INVENTION

Accordingly, a primary object of the present invention is to provide an improved apparatus for easily, reliably and quickly connecting a computer to peripheral components.

Another object is to provide such an apparatus so that minimum skill and training is required to make such connections.

Still another object of the present invention is to provide an apparatus which will eliminate the possibility of improper cabling connections which could result in damage to the hardware, to the software, or to data stored in memory.

Still a further object of the invention is to provide an apparatus which will reduce the overall manufacturing costs of the system by eliminating expensive cables and which will improve service life and reliability.

Still another object of the invention is to provide a method which will reduce the physical space requirements for operation of the computer and its associated peripheral components.

Still another object of the invention is to provide an apparatus which will reduce electrical energy consumption by eliminating redundant power supplies.

Other objects and advantages of the invention will become readily apparent to those of ordinary skill by reading the following detailed description and the claims in view of the drawings included herein.

DESCRIPTION OF THE DRAWINGS

FIG. 1 depicts one embodiment of the present invention showing how a lap-top computer can be associated with peripheral components as desired;

FIG. 2 shows the back of the lap-top computers;

FIG. 4 is a perspective view showing the back and side of the lap-top computer of the second embodiment.

DETAILED DESCRIPTION OF THE PREFERRED EMBODIMENT

Figure 3:
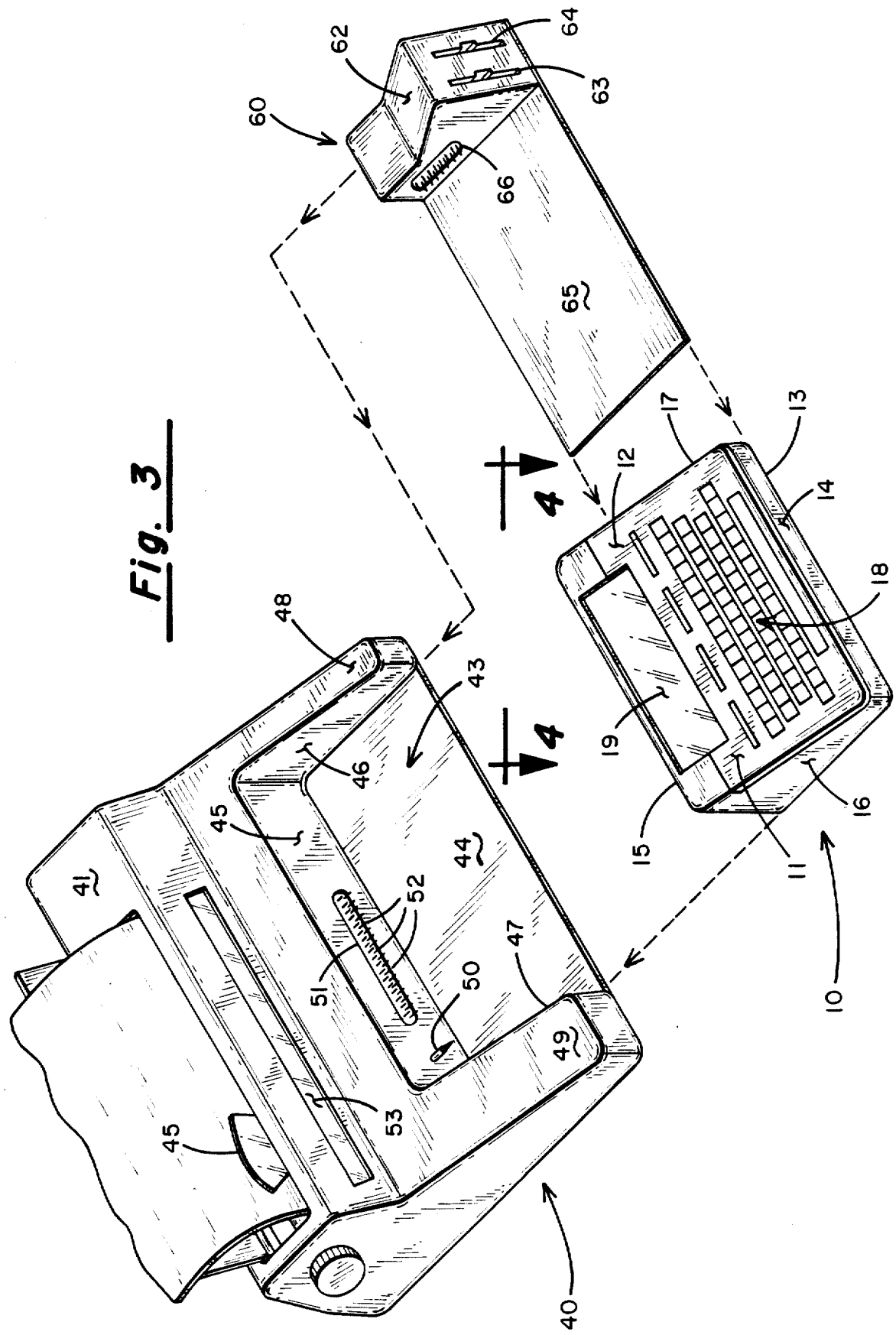
FIG. 3 shows a perspective view of a second embodiment of the preferred invention showing that various peripheral components can be packaged in modular form to permit certain of them to be associated with and transported with the lap-top computer while others are left behind.

A preferred embodiment of the present invention is shown in FIGS. 1 and 2. FIG. 1 depicts a typical lap-top computer 10 and a peripheral equipment assembly 40.

The computer 10 includes a housing 11 which can contain a variety of components, but will typically contain processing means (such as one or more microprocessor or microcomputer chips), a small random access memory, means for electrically connecting various components of the computer, and a battery checkup.

The housing includes a top surface 12, a bottom surface 13, front surface 14, a back surface 15, and two side surfaces 16 and 17. Associated with the top surface 12 are a keyboard 18 and a display 19. Associated with the back surface 15 of the housing 10 is an alignment pin receiving hole 20 and a female electrical connector assembly 21. The female electrical connector assembly 21 has a series of ports or holes 22 which are designed to readily and easily mate with prongs of an associated male electrical connector assembly which will be described in greater detail later. Inside the housing 10, the various ports 22 of the female electrical connector assembly 21 are hardwired to the various operational components of the lap-top computer 10. Certain of the ports 22 can be used to transmit power while others are used to transmit data.

The peripheral equipment assembly 40 includes a housing 41 intended to contain the peripheral equipment commonly used in conjunction with a lap-top computer. As drawn, such peripheral equipment includes two floppy disc drives 42a and b, a display 53, and a printer 45. While the printer depicted is of the daisy wheel variety, those skilled in the art will recognize that other types of printers, such as a dot matrix printer, could be substituted. Other peripheral equipment which is not specifically shown (such as a modem or a hard or rigid disc drive) could also be located within the housing.

In the preferred embodiment, the peripheral equipment assembly 40 is built so that when associated with the computer 10 the entire unit will have a shape and size similar to that of an electric typewriter. This overall configuration is achieved by making the peripheral equipment assembly 40 U-shaped and making the interior of the legs 48 and 49 of the "U" far enough apart so that they form a channel 43 into which the computer 10 will fit.

Further defining channel 43 is a floor 44, a back surface 45 and the inside surfaces 46 and 47 of the legs 48 and 49. The channel 43 is designed so that when the computer 10 is associated with the peripheral equipment assembly 40, it is supported by the floor 44 and slightly pinched between legs 48 and 49.

The structure of the peripheral equipment assembly 40 primarily responsible for allowing it to be easily joined electrically with the computer 10 includes an alignment pin 50, and a male electrical connector assembly 51 which has multiple prongs 52. The alignment pin 50 and the prongs 52 of the male electrical connector assembly 51 are intended to mate with the alignment pin receiving hole 20 and the ports 22 of the female electrical connector assembly 21, respectively.

The presence of the alignment pin 50 and the alignment pin receiving hole 20 ensures that the correct prongs 52 of the male electrical connector assembly 51 mate with the correct ports 22 of the female assembly 21 to form appropriate electrical connections between the various components of the computer 10 and the various components of the peripheral equipment assembly 40. In this configuration, cabling for plugging the apparatus into an electrical wall socket or into a telephone jack for operating the modem or into other equipment which is not part of the peripheral equipment assembly is done through the back of the peripheral equipment assembly 40 which is generally not intended to be transported.

Turning now to the embodiment shown in FIGS. 3 and 4, three modular assemblies are shown: a lap-top computer 10, a main peripheral equipment assembly 40 and a second peripheral assembly which, for clarity, will be referred to as a dual disc drive assembly 60. A second female connector assembly 61 has been added to the side 17 of the computer 10 and the distance between the two legs 48 and 49 of the peripheral equipment assembly 40 has been increased so that both the computer 10 and the dual disc drive assembly 60, when connected together, will fit between the legs 48 and 49.

The dual disc drive assembly 60 has a housing 62 which contains a first disc drive 63 and a second disc drive 64. Projecting from one side of the housing 62 is a floor 65 upon which the computer 10 is supported when connected to the disc drive assembly 60. Associated with the same side of the housing 62 as the floor 65 is a male electrical connector assembly 66. The male electrical assembly 66 is designed to mate with the female electrical assembly 61 to form the necessary power and data transmission connections between the computer 10 and the disc drive assembly 60. Also, electrical connection assemblies 21, 51, 61 and 66 are all designed that it is impossible for the user to make incorrect electrical connections.

With the embodiments shown in FIGS. 3 and 4, the user is able to easily separate the computer 10 and the disc drive assembly 60 from the main peripheral equipment assembly for ease of transportation. The user also can easily separate the disc drive assembly 60 from the computer 10 if desirable.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. Apparatus for temporarily mechanically containing and electrically connecting plural computer components together into a unitary assembly, comprising:
   (a) a portable lap-top computer module, said computer module including a first housing having a top surface, a bottom surface, a front surface, opposite side surfaces and a back surface, one of said surfaces including a first electrical connector member;
   (b) a first peripheral equipment assembly, said assembly including a second housing defining a U-shaped channel for receiving and containing said lap-top computer module within said U-shaped channel, and at least one peripheral component contained within said second housing and capable of being used in conjunction with said lap-top computer; and
   (c) said first peripheral equipment assembly including means receiving said first electrical connector for electrically coupling said lap-top computer with said peripheral equipment assembly for transmission of power and data representing signals between said lap-top computer and said peripheral equipment assembly when said lap-top computer is fitted into said U-shaped channel.

2. The apparatus of claim 1 wherein said lap-top computer contains a plurality of components including processing means, memory means, display means, and data entry means each of which are electrically connected to said first connector.

3. The apparatus of claim 1 wherein said means for receiving said first electrical connector comprises a second connector for electrically connecting the peripheral components contained within said second housing to said first connector member.

4. The apparatus of claim 3 wherein said U-shaped channel is dimensioned for properly aligning the lap-top computer and the peripheral equipment assembly so that said first connector and said second connector mate with one another.

5. The apparatus of claim 4 and further including an alignment pin associated with the peripheral equipment assembly and a corresponding pin receiving bore associated with the lap-top computer.

6. The apparatus of claim 1 and further including:
   (a) a second peripheral equipment assembly comprised of a third housing and at least one additional peripheral component electrically connected to said lap-top computer and said second peripheral equipment assembly dimensioned to fit together within said U-shaped channel of said first peripheral equipment assembly; and
   (b) means for electrically connecting said second peripheral equipment assembly to said lap-top computer.

7. The apparatus of claim 1 wherein said first peripheral equipment assembly includes printing means, memory means and display means.

8. The apparatus of claim 1 wherein said first peripheral equipment assembly includes printing means and memory means.

* * * * *